(12) United States Patent
Fenton

(10) Patent No.: US 12,415,448 B1
(45) Date of Patent: *Sep. 16, 2025

(54) DOUBLE FOLDAWAY SEAT ASSEMBLY INCLUDING AN ADAPTER PLATE AND METHOD OF REMOVABLY INSTALLING A DOUBLE FOLDAWAY SEAT ASSEMBLY IN A VEHICLE

(71) Applicant: Fenton Mobility Products, Inc., Randolph, NY (US)

(72) Inventor: Scott Ivan Fenton, Sinclairville, NY (US)

(73) Assignee: Fenton Mobility Products, Inc., Randolph, NY (US)

( * ) Notice: Subject to any disclaimer, the term of this patent is extended or adjusted under 35 U.S.C. 154(b) by 81 days.

This patent is subject to a terminal disclaimer.

(21) Appl. No.: 18/518,747

(22) Filed: Nov. 24, 2023

Related U.S. Application Data

(63) Continuation of application No. 17/450,745, filed on Oct. 13, 2021, now Pat. No. 11,858,384.

(51) Int. Cl.
*B60N 2/10* (2006.01)
*B60N 2/30* (2006.01)

(52) U.S. Cl.
CPC ............ *B60N 2/307* (2013.01); *B60N 2/3011* (2013.01)

(58) Field of Classification Search
CPC ............................. B60N 2/307; B60N 2/3011
See application file for complete search history.

(56) References Cited

U.S. PATENT DOCUMENTS

| 5,492,389 | A | 2/1996 | McClintock et al. |
| 5,697,662 | A * | 12/1997 | Leftwich ............ B60N 2/01583 297/475 |
| 6,345,856 | B1 * | 2/2002 | Minai ................ B60N 2/01583 297/336 |
| 6,846,044 | B2 | 1/2005 | Moffa et al. |
| 6,974,184 | B1 | 12/2005 | Moffa et al. |
| D521,756 | S | 5/2006 | Moffa et al. |
| 8,282,149 | B2 | 10/2012 | Kniffin et al. |
| 9,067,517 | B1 * | 6/2015 | Roeglin ............. B64D 11/0696 |
| 9,073,451 | B1 | 7/2015 | Wurzer |
| 11,427,109 | B1 * | 8/2022 | Wurzer .................. B60N 2/015 |
| 12,200,911 | B2 * | 1/2025 | Liu ....................... H05K 7/2049 |
| 2004/0189077 | A1 * | 9/2004 | Moffa .................. B60N 2/3011 297/452.39 |
| 2005/0269842 | A1 | 12/2005 | Braun |
| 2006/0273645 | A1 | 12/2006 | Ferrari et al. |
| 2015/0321586 | A1 | 11/2015 | Szybisty et al. |
| 2022/0332233 | A1 | 10/2022 | Gropp et al. |

* cited by examiner

*Primary Examiner* — Amy J. Sterling
(74) *Attorney, Agent, or Firm* — Harter Secrest & Emery LLP; Michael Nicholas Vranjes

(57) ABSTRACT

A seat assembly for a vehicle, including an adapter plate operatively arranged to be connected to a floor of the vehicle, including a front edge, a rear edge, a first side edge, a second side edge, at least one through-hole, at least one threaded through-bore, and an aperture arranged between and spaced apart from the front edge and the second edge, and the first edge and the second edge, wherein the aperture includes an aperture front linear edge, an aperture rear linear edge, an aperture first side linear edge, and an aperture second side linear edge, a base operatively arranged to be removably connected to the adapter plate, a column fixedly secured to the base, and a seat rotatably connected to the column.

20 Claims, 6 Drawing Sheets

DOUBLE FOLDAWAY SEAT ASSEMBLY INCLUDING AN ADAPTER PLATE AND METHOD OF REMOVABLY INSTALLING A DOUBLE FOLDAWAY SEAT ASSEMBLY IN A VEHICLE

CROSS-REFERENCE TO RELATED APPLICATIONS

This application is filed under 35 U.S.C. § 120 as a continuation of U.S. patent application Ser. No. 17/450,745, filed on Oct. 13, 2021, which application is incorporated herein by reference in its entirety.

FIELD

The present invention relates generally to floor-mounted seats and seat adapters for positioning and locking components within a transportation vehicle, and in particular, an adapter plate that allows a double foldaway seat to be safely secured in various positions within the vehicle.

BACKGROUND

Cars, trucks, vans, airplanes, para-transit vehicles, buses, taxicabs, mobility cars, accessible sport-utility vehicles (SUV), and the like, have been adapted to accommodate various types of equipment, cargo, and seating arrangements. Seating arrangements include standard one, two, or three passenger seating, transit seating, and wheelchair accessible seating. One type of two passenger seat is known as a double foldaway seat, which easily folds up against the vehicle wall, making way for storage or equipment for handicapped passengers under The Americans with Disabilities Act (ADA). One important concern of the design of double foldaway seats thus is to, when in the stowed position, take up as little volume in the vehicle as possible. To do this, the base of the double foldaway seat is very small and located as close to the vehicle wall as possible, while still allowing the seat to be moved from a deployed position to a stowed position. However, this leads to failure of, inter alia, Federal Motor Vehicle Safety Standard (FMVSS) No. 207, which establishes requirements for seats, their attachment assemblies, and their installation, to minimize the possibility of failure as a result of forces on the seat in a vehicle impact.

Therefore, there has been a long-felt need for a double foldaway seat assembly including an adapter plate operatively arranged to secure the double foldaway seat to the vehicle floor and minimizing its used volume within the vehicle cabin.

SUMMARY

According to aspects illustrated herein, there is provided a seat assembly for a vehicle, comprising an adapter plate operatively arranged to be connected to a floor of the vehicle, comprising a front edge, a rear edge, a first side edge, a second side edge, at least one through-hole, at least one threaded through-bore, and an aperture arranged between and spaced apart from the front edge and the second edge, and the first edge and the second edge, wherein the aperture includes an aperture front linear edge, an aperture rear linear edge, an aperture first side linear edge, and an aperture second side linear edge, a base operatively arranged to be removably connected to the adapter plate, a column fixedly secured to the base, and a seat rotatably connected to the column.

In some embodiments, the at least one through-hole comprises six through-holes arranged between and spaced apart from the aperture rear linear edge and the rear edge, and two through-holes arranged between the aperture front linear edge and the front edge. In some embodiments, the at least one threaded through-bore comprises three threaded through-bores arranged between and spaced apart from the aperture front linear edge and the front edge, and three threaded through-holes arranged between and spaced apart from the aperture rear linear edge and the rear edge.

In some embodiments, the at least one through-hole comprises a countersink. In some embodiments, the base is secured to the adapter plate via one or more bolts extending through the base and threadably engaging the at least one threaded through-bore. In some embodiments, the adapter plate is connected to the floor via one or more bolts that extend through the at least one through-holes and the floor. In some embodiments, the seat assembly further comprises a backrest rotatably connected to the seat. In some embodiments, in a deployed position, the seat overlaps a line extending vertically from the second edge, and in a stowed position, the seat does not overlap the line.

According to aspects illustrated herein, there is provided a double foldaway seat assembly for a vehicle, comprising an adapter plate operatively arranged to be connected to a floor of the vehicle, comprising a front edge, a rear edge, a first side edge, a second side edge, a plurality of through-holes, a plurality of threaded through-bores, and an aperture arranged between and spaced apart from the front edge and the second edge, and the first edge and the second edge, wherein the aperture comprises an aperture front edge arranged parallel to the front edge, an aperture rear edge arranged parallel to the rear edge, an aperture first side edge, and an aperture second side edge, a base operatively arranged to be connected to the adapter plate, a column fixedly secured to the base, a seat rotatably connected to the column, and a backrest rotatably connected to the seat.

In some embodiments, the plurality of through-holes comprises six through-holes arranged between and spaced apart from the aperture rear edge and the rear edge, and two through-holes arranged between the aperture front edge and the front edge. In some embodiments, the plurality of threaded through-bores comprises three threaded through-bores arranged between and spaced apart from the aperture front edge and the front edge, and three threaded through-holes arranged between and spaced apart from the aperture rear edge and the rear edge. In some embodiments, each through-hole of the plurality of through-holes comprises a countersink.

In some embodiments, the base is secured to the adapter plate via a plurality of bolts extending through the base and threadably engaging the plurality of threaded through-bores. In some embodiments, the adapter plate is connected to the floor via a plurality of bolts that extend through the plurality of through-holes and the floor. In some embodiments, in a deployed position, the seat overlaps a line extending vertically from the second edge, and in a stowed position, the seat does not overlap the line.

According to aspects illustrated herein, there is provided a seat assembly for a vehicle, comprising an adapter plate operatively arranged to be connected to a floor of the vehicle, comprising a top surface, a bottom surface, a front edge, a rear edge, a first side edge, a second side edge, at least one through-hole, and at least one threaded through-bore, a base operatively arranged to be removably connected to the adapter plate, the base comprising a lip arranged substantially perpendicular to the top surface, a column fixedly secured to the base, and a seat rotatably connected to the column.

In some embodiments, the adapter plate further comprises an aperture arranged between and spaced apart from the front edge and the second edge, and the first edge and the second edge, wherein the aperture comprises at least one linear edge. In some embodiments, the adapter plate further comprises an aperture, wherein the aperture comprises at least one linear edge. In some embodiments, the adapter plate comprises an aperture front linear edge and an aperture rear linear edge. In some embodiments, the at least one linear edge is arranged parallel to at least one of the front edge, the rear edge, the first side edge, and the second side edge.

According to aspects illustrated herein, there is provided a seat assembly for a vehicle, comprising an adapter plate operatively arranged to be connected to a floor of the vehicle, comprising a front edge, a rear edge, a first side edge, a second side edge, at least one through-hole, and at least one threaded through-bore, a base operatively arranged to be removably connected to the adapter plate, a column fixedly secured to the base, and a seat rotatably connected to the column.

In some embodiments, the adapter plate further comprises an aperture arranged between and spaced apart from the front edge and the second edge, and the first edge and the second edge. In some embodiments, the aperture comprises an aperture front edge, an aperture rear edge, an aperture first side edge, and an aperture second side edge. In some embodiments, the at least one through-hole comprises six through-holes arranged between and spaced apart from the aperture rear edge and the rear edge, and two through-holes arranged between the aperture front edge and the front edge. In some embodiments, the at least one threaded through-bore comprises three threaded through-bores arranged between and spaced apart from the aperture front edge and the front edge, and three threaded through-holes arranged between and spaced apart from the aperture rear edge and the rear edge. In some embodiments, the at least one through-hole comprises a countersink. In some embodiments, the base is secured to the adapter plate via one or more bolts extending through the base and threadably engaging the at least one threaded through-bore. In some embodiments, the adapter plate is connected to the floor via one or more bolts that extend through the at least one through-holes and the floor. In some embodiments, the seat assembly further comprises a backrest rotatably connected to the seat. In some embodiments, in a deployed position, the seat overlaps a line extending vertically from the second edge, and in a stowed position, the seat does not overlap the line.

According to aspects illustrated herein, there is provided a double foldaway seat assembly for a vehicle, comprising an adapter plate operatively arranged to be connected to a floor of the vehicle, comprising a front edge, a rear edge, a first side edge, a second side edge, a plurality of through-holes, and a plurality of threaded through-bores, a base operatively arranged to be connected to the adapter plate, a column fixedly secured to the base, a seat rotatably connected to the column, and a backrest rotatably connected to the seat.

In some embodiments, the adapter plate further comprises an aperture arranged between and spaced apart from the front edge and the second edge, and the first edge and the second edge. In some embodiments, the aperture comprises an aperture front edge arranged parallel to the front edge, an aperture rear edge arranged parallel to the rear edge, an aperture first side edge, and an aperture second side edge. In some embodiments, the plurality of through-holes comprises six through-holes arranged between and spaced apart from the aperture rear edge and the rear edge, and two through-holes arranged between the aperture front edge and the front edge. In some embodiments, the plurality of threaded through-bores comprises three threaded through-bores arranged between and spaced apart from the aperture front edge and the front edge, and three threaded through-holes arranged between and spaced apart from the aperture rear edge and the rear edge. In some embodiments, each through-hole of the plurality of through-holes comprises a countersink. In some embodiments, the base is secured to the adapter plate via a plurality of bolts extending through the base and threadably engaging the plurality of threaded through-bores. In some embodiments, the adapter plate is connected to the floor via a plurality of bolts that extend through the plurality of through-holes and the floor. In some embodiments, in a deployed position, the seat overlaps a line extending vertically from the second edge, and in a stowed position, the seat does not overlap the line.

According to aspects illustrated herein, there is provided a method of installing a seat assembly in a vehicle, the method comprising arranging an adapter plate on a floor of the vehicle, wherein the adapter plate is separated from a wall panel of the vehicle by a space and includes a plurality of through-holes and a plurality of threaded through-bores, securing the adapter plate to the floor via a first plurality of bolts and a plurality of nuts, the first plurality of bolts extending through the plurality of through-holes and the floor, arranging a base of a seat on the adapter plate, and securing the base to the adapter plate by a second plurality of bolts extending through the base and threadably engaging the plurality of threaded through-bores.

According to aspects illustrated herein, there is provided a method of installing a double foldaway seat in a vehicle, the method comprising the following steps.

The adapter plate is arranged on the vehicle floor in the desired location at least 6.5 inches from the vehicle side wall panels, since the panels will cause interference with opening the double foldaway seat if it is arranged closer than 6.5 inches. The first side of the adapter plate, which comprises the six (6) countersunk holes is arranged towards the rear of the vehicle.

The user then measures to determine if there are any hazard or obstructions under the floor that must be avoided or temporarily moved.

The user then marks the centers of the at least seven (7) holes that are to be used. Each of the three (3) holes on the lateral sides must be used, and at least one (1) of the three (3) holes arranged between the lateral sides must be used, although the user may decide to use all three (3) holes. The holes are then drilled out in the vehicle hole at the marked locations.

The user then deburrs the edges of the drilled holes and applies a rust inhibiting treatment to prevent corrosion of the exposed metal.

The adapter plate is then aligned with the drilled holes and secured to the vehicle floor using fasteners, for example, flush head stud bolts (e.g., FHS ½ inch-13×3). The bolts are placed through the adapter plate and then through the holes previously drilled in the vehicle floor.

From the underside of the vehicle, the user then seals around all seven (7) bolts with any material suitable to prevent moisture and/or debris from entering the vehicle. The user then assembles washers (e.g., 1.375 inches O.D. flat washer grade 8) and nuts (e.g., HHS flange locknut ½-13) on each bolt and tightens the nuts to a maximum of 30-foot pounds, with full flange nut engagement. In some embodiments, the bolt connections do not exceed ⅛ inch of sheet metal deformations. In some embodiments, the washers may be clipped or ground to achieve clearance if necessary.

The user then arranged the double foldaway seat onto the plate and installs ten (10) bolts (e.g., HHS ⅜-20×1 inch grade 8), ten (10) lock washers (e.g. ½ inch split lock washer, zinc plated), and ten (10) washers (e.g., ½ inch grade 9 flat washer, zinc plated). In some embodiments, the bolts extend, in order, through the lock washers, the flat washers, the base of the double foldaway seat, and threadably engage the adapter plate. All of the bolts are tightened until the lock washers are fully compressed.

In some embodiments, the ends of the bolts or fasteners comprise a cap or shield. In some embodiments, the drill bits used to drill the holes comprise stop collars. In some embodiments, rust inhibiter is applied to all raw edges. In some embodiments, all holes are thoroughly sealed to prevent moisture, dust, and fume infiltration. In some embodiments, the fuel tank is lowered or removed prior to installing the adapter plate and double foldaway seat. In some embodiments, the spare tire is lowered or removed prior to installing the adapter plate and double foldaway seat. In some embodiments, if carpet is arranged on the vehicle floor, the carpet is at least partially removed prior to installing the adapter plate and double foldaway seat.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
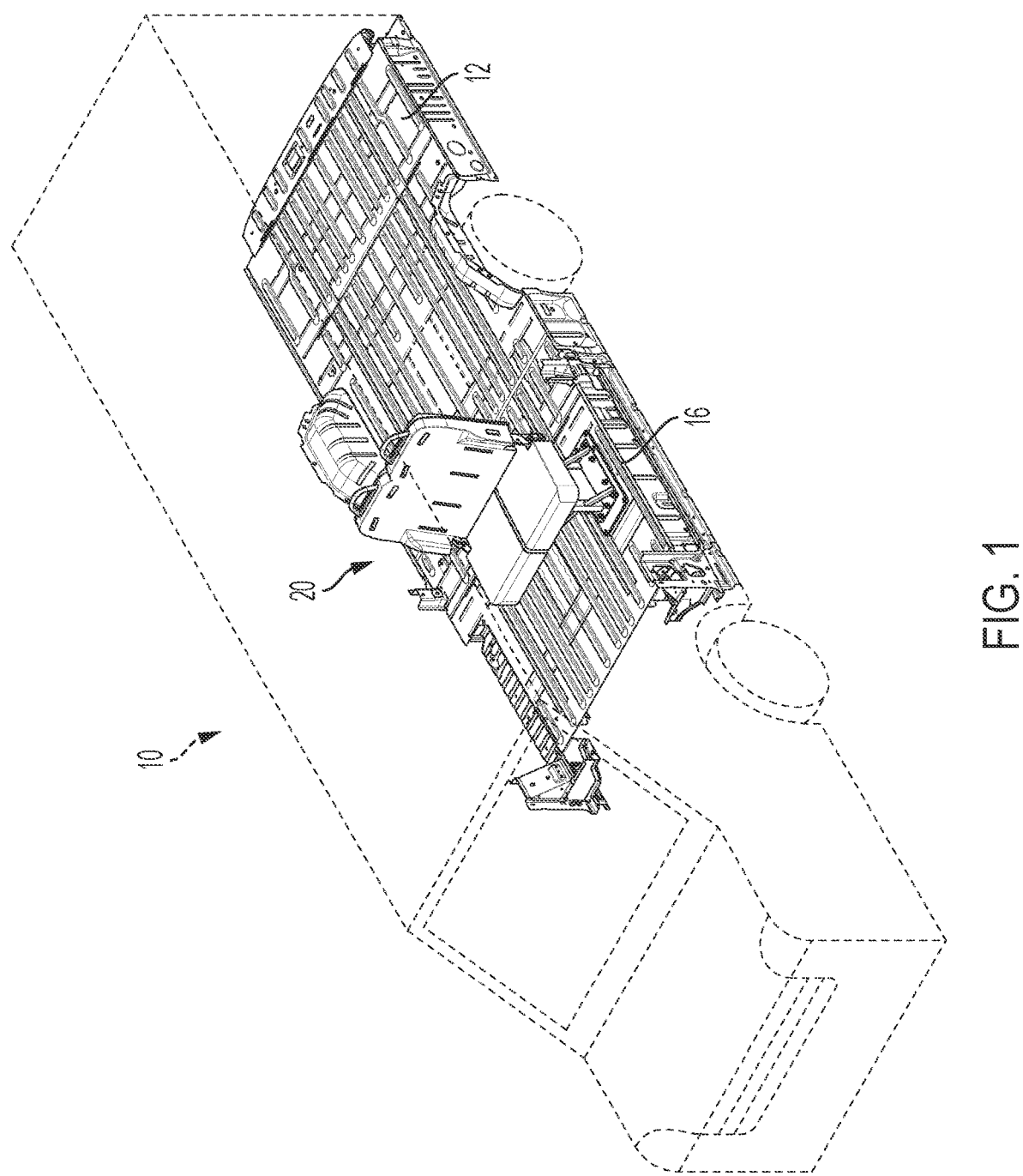
FIG. 1 is a front perspective view of a vehicle including a double foldaway seat assembly, in accordance with some embodiments of the present disclosure.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or a device comprising a second element and a third element. A similar interpretation is intended when the phrase "used in at least one of:" is used herein.

By "non-rotatably connected" elements, we mean that: the elements are connected so that whenever one of the elements rotate, all the elements rotate; and relative rotation between the elements is not possible. Radial and/or axial movement of non-rotatably connected elements with respect to each other is possible, but not required. By "rotatably connected" elements, we mean that: the elements are rotatable with respect to each other; and whenever one element is displaced radially and/or axially, all the elements are displaced radially and/or axially.

Adverting now to the figures, FIG. 1 is a front perspective view of vehicle 10 including double foldaway seat assembly or seat assembly 20, in accordance with some embodiments of the present disclosure. Vehicle 10 comprises floor 12 and sidewall panel 16. Seat assembly 20 is connected to vehicle 10, specifically floor 12, as described in greater detail below. Vehicle 10 may be any type of vehicle suitable for adaptability with seat assembly 20, for example, a van, bus, shuttle, car, truck, etc.

Figure 2:
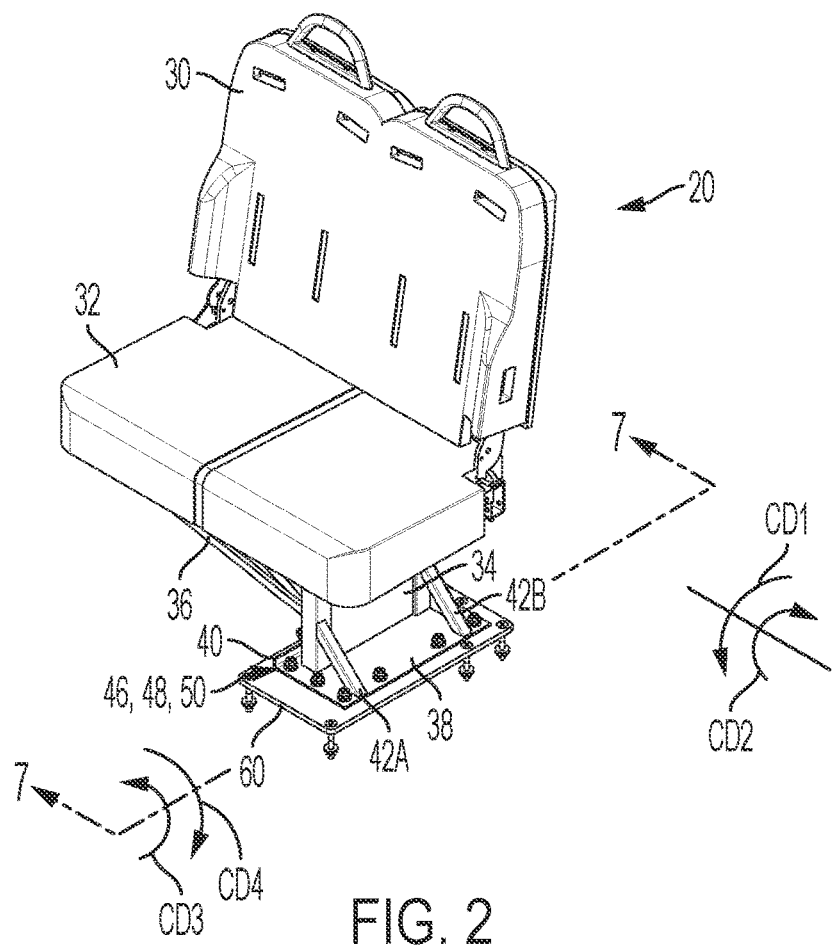
FIG. 2 is front perspective view of the double foldaway seat assembly shown in FIG. 1, in a deployed position.
Figure 3:
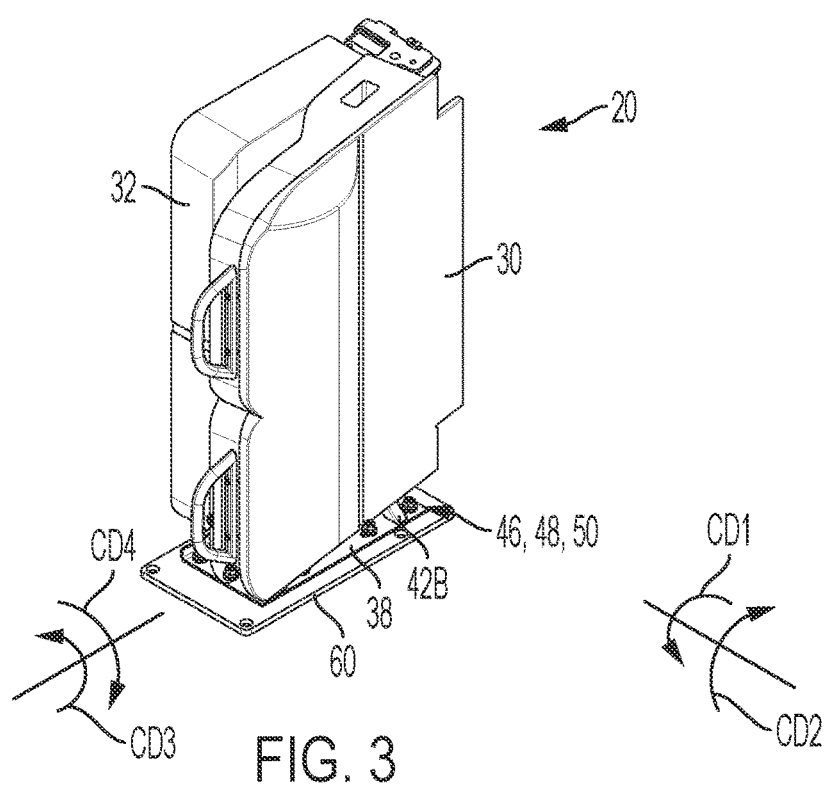
FIG. 3 is front perspective view of the double foldaway seat assembly shown in FIG. 1, in a stowed position.
Figure 4:
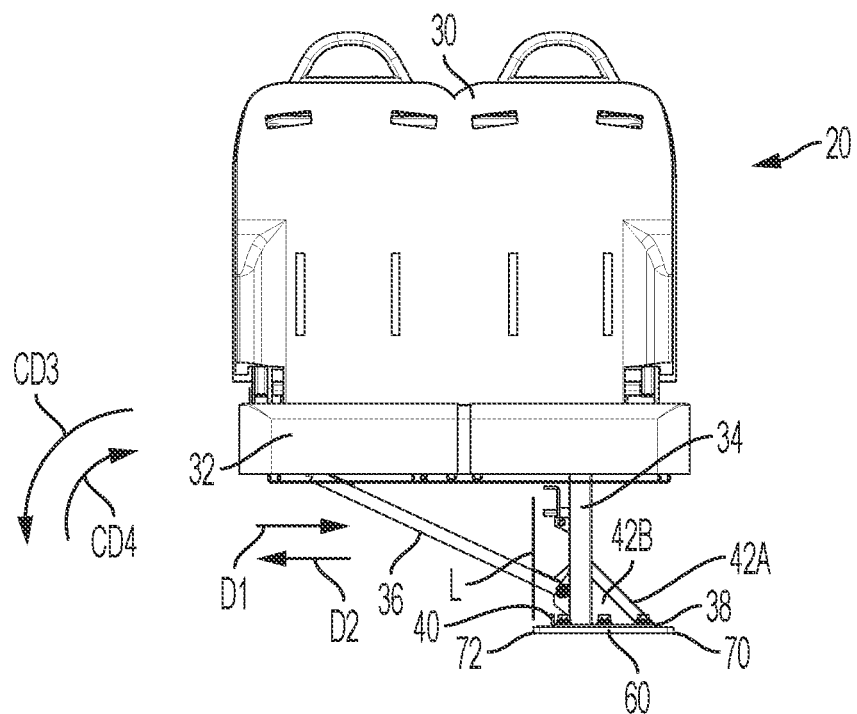
FIG. 4 is front elevational view of the double foldaway seat assembly shown in FIG. 1, in the deployed position.
Figure 5:
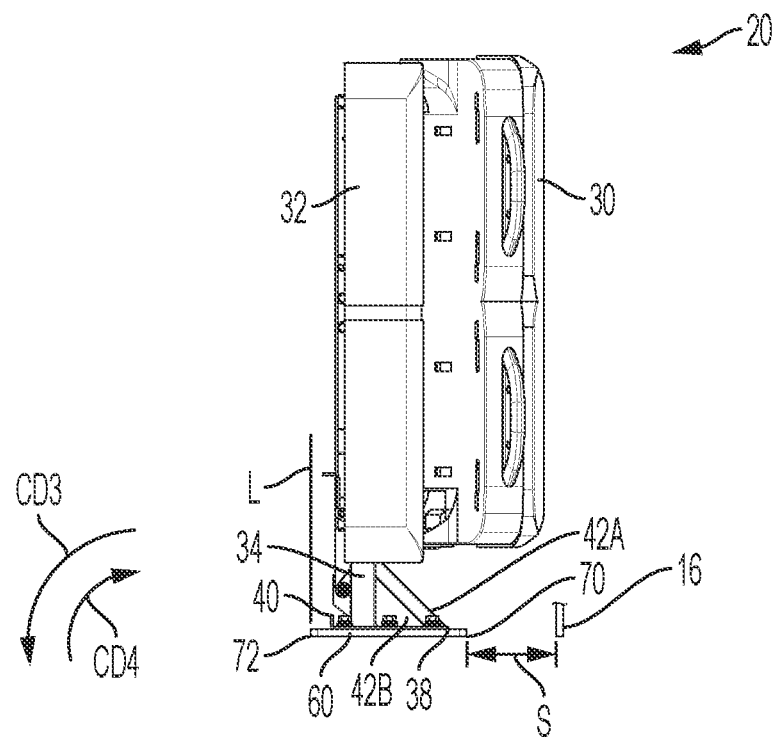
FIG. 5 is front elevational view of the double foldaway seat assembly shown in FIG. 1, in the stowed position.
Figure 6:
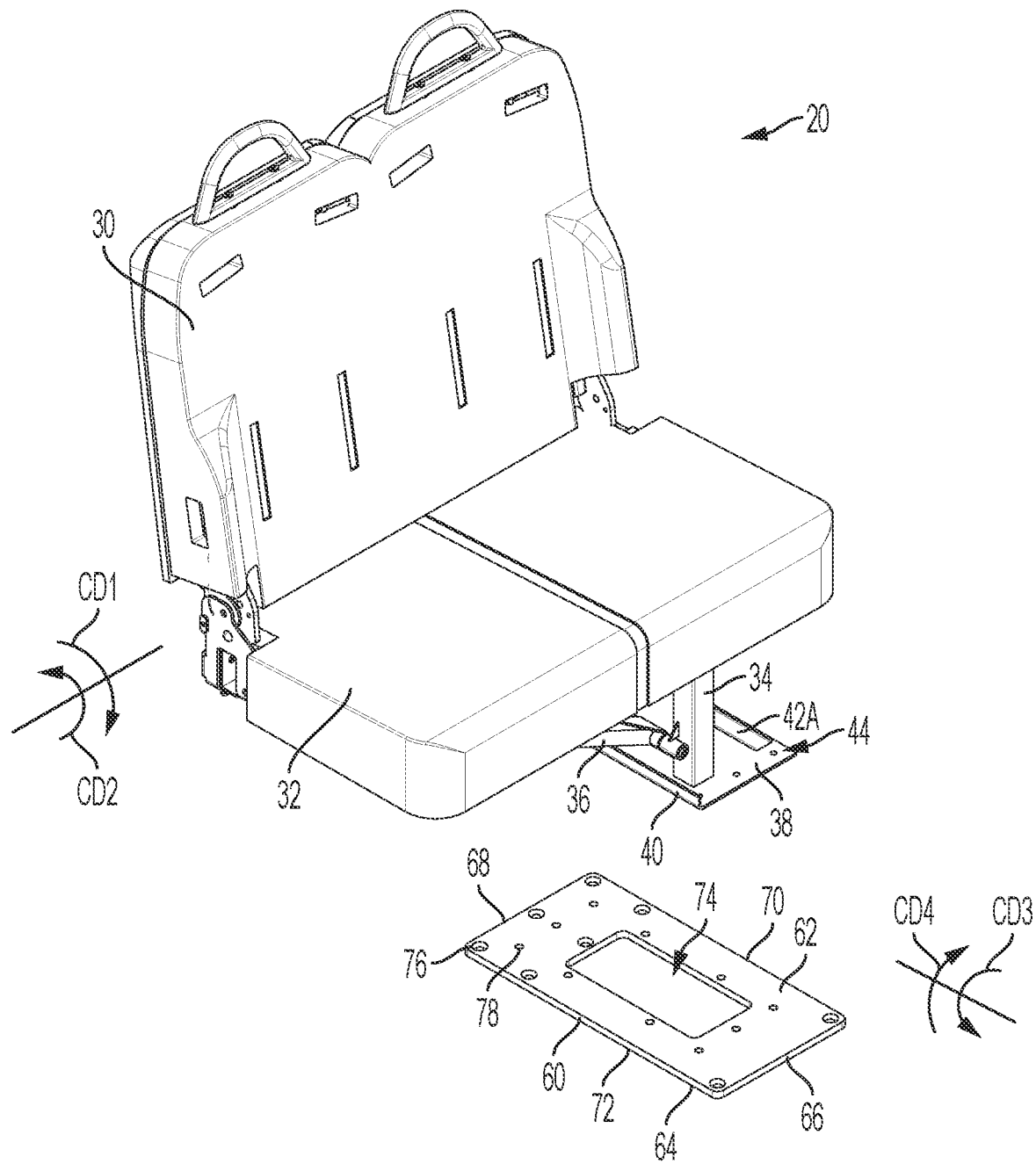
FIG. 6 is an exploded perspective view of the double foldaway seat assembly shown in FIG. 2.
Figure 7:
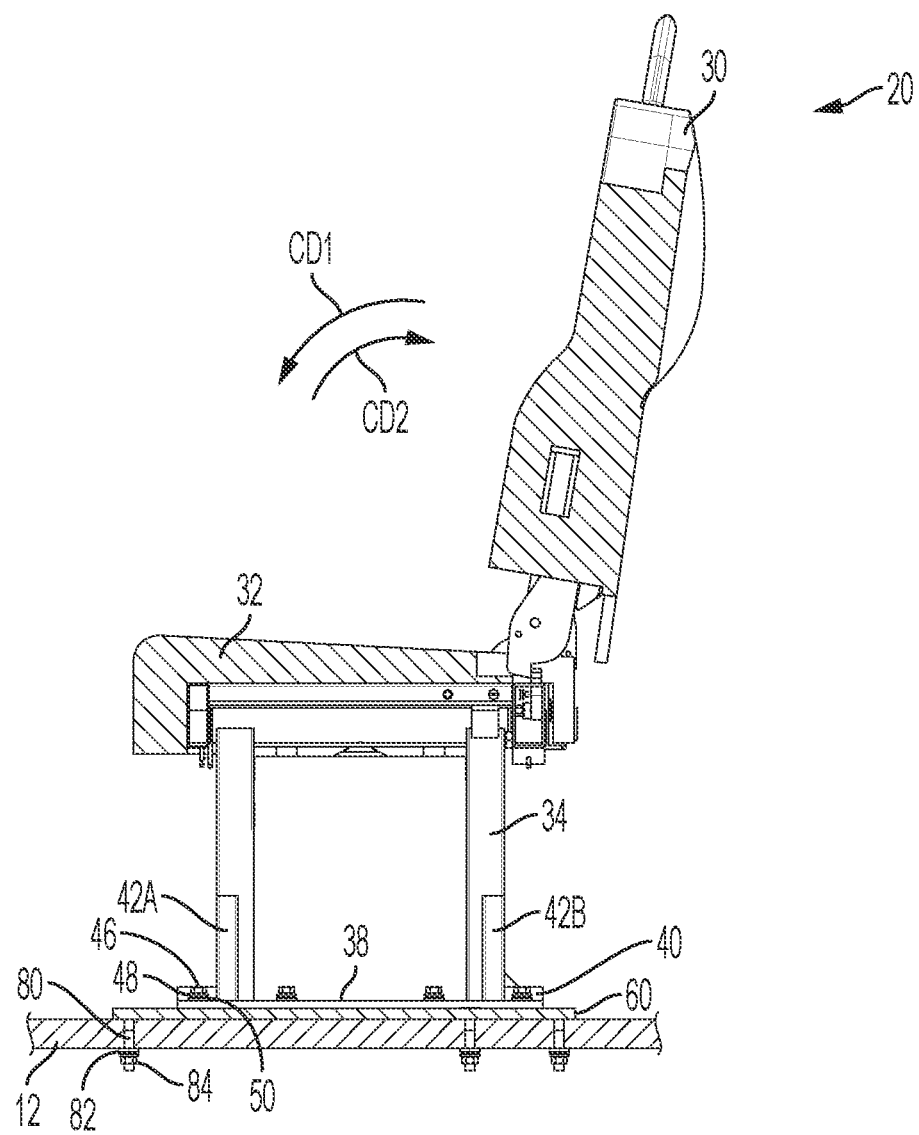
FIG. 7 is a cross-sectional view of the double foldaway seat assembly taken generally alone line 7-7 in FIG. 2.

FIG. 2 is front perspective view of seat assembly 20, in a deployed position. FIG. 3 is front perspective view of seat assembly 20, in a stowed position. FIG. 4 is front elevational view of seat assembly 20, in the deployed position. FIG. 5 is front elevational view of seat assembly 20, in the stowed position. FIG. 6 is an exploded perspective view of seat assembly 20. FIG. 7 is a cross-sectional view of seat assembly 20 taken generally alone line 7-7 in FIG. 2. Seat assembly 20 generally comprises backrest 30, seat 32, column 34, base 38, and adapter plate 60. The following description should be read in view of FIGS. 1-7.

Seat 32 is operatively arranged to support a sitting passenger. Backrest 30 is rotatably or hingedly connected to seat 32. To move backrest 30 from the deployed position shown in FIG. 2 to the stowed position shown in FIG. 3, backrest 30 is displaced in circumferential direction CD1 with respect to seat 32. To move back to the deployed position from the stowed position, backrest 30 is displaced in circumferential direction CD2 with respect to seat 32. In the deployed position, backrest 30 is arranged generally perpendicular or at an angle greater than 90 degrees to seat 32. In the stowed position, backrest 30 is arranged generally parallel to and/or abuts against seat 32.

Seat 32 is supported by, and connected to vehicle 10 through, column 34. Column 34 connects seat 32 to base 38. Seat 32 is rotatably connected to a first end of column 34. The second end of column 34 is fixedly secured or non-rotatably connected to base 38 via any suitable means, for example, welding, soldering, bolts, rivets, screws, nails, adhesives, etc. In some embodiments, column 34 is further connected to base 38 via trusses 42A-B. Truss 42A extends from the top surface of base 38 to column 34 at a point between its first end and second end (i.e., an intermediate point). Truss 42B is spaced apart from truss 42A and extends from the top surface of base 38 to column 34 at a point between its first end and second end (i.e., an intermediate point). in some embodiments, truss 42B further comprises a triangular wall enclosing the truss structure, thereby adding further support to truss 42B.

In some embodiments, base 38 is further connected to seat 32 by one or more arms 36. Each arm 36 comprises a first end rotatably and translationally connected to seat 32 and a second end rotatably connected to column 34. To move seat 32 from the deployed position shown in FIG. 4 to the stowed position shown in FIG. 5, seat 32 is displaced in circumferential direction CD4 with respect to column 34. As seat 32 is displaced in circumferential direction CD4, the first end of arm 36 slides along the bottom of seat 32 in direction D1. To move seat 32 back to the deployed position from the stowed position, seat 32 is displaced in circumferential direction CD3 with respect to column 34. As seat 32 is displaced in circumferential direction CD3, the first end of arm 36 slides along the bottom of seat 32 in direction D2. In some embodiments, the second end of arm 36 is rotatably connected at an intermediate point on column 34 (i.e., a point between and spaced apart from the first and second ends of column 34).

Base 38 is generally a plate comprising a front edge directed toward the front of vehicle 10, a rear edge directed toward the rear of vehicle 10, and two side edges. In some embodiments, base 38 comprises lip 40 connected to a side edge. Lip 40 is arranged substantially perpendicular to the top surface of base 38. Base 38 further comprises a plurality of through-holes. In some embodiments, base 38 comprises ten (10) total through-holes. For example, base 38 may comprise three (3) through-bores arranged along the front edge, three (3) through-bores arranged along the rear edge, two (2) slotted through-holes arranged along the first side edge, and two (2) slotted through-holes arranged along the second side edge. Base 38 is operatively arranged to be secured to adapter plate 60, for example, via bolts 46, lock washers 48, and washers 50. In some embodiments, bolts 46 extend through lock washers 48, flat washers 50, base 38, and threadably engage adapter plate 60, as will be described in greater detail below. In some embodiments, base 38 is substantially perpendicular to column 34. In some embodiments, in the deployed position, base 38 is substantially parallel to seat 32.

Figure 8A:
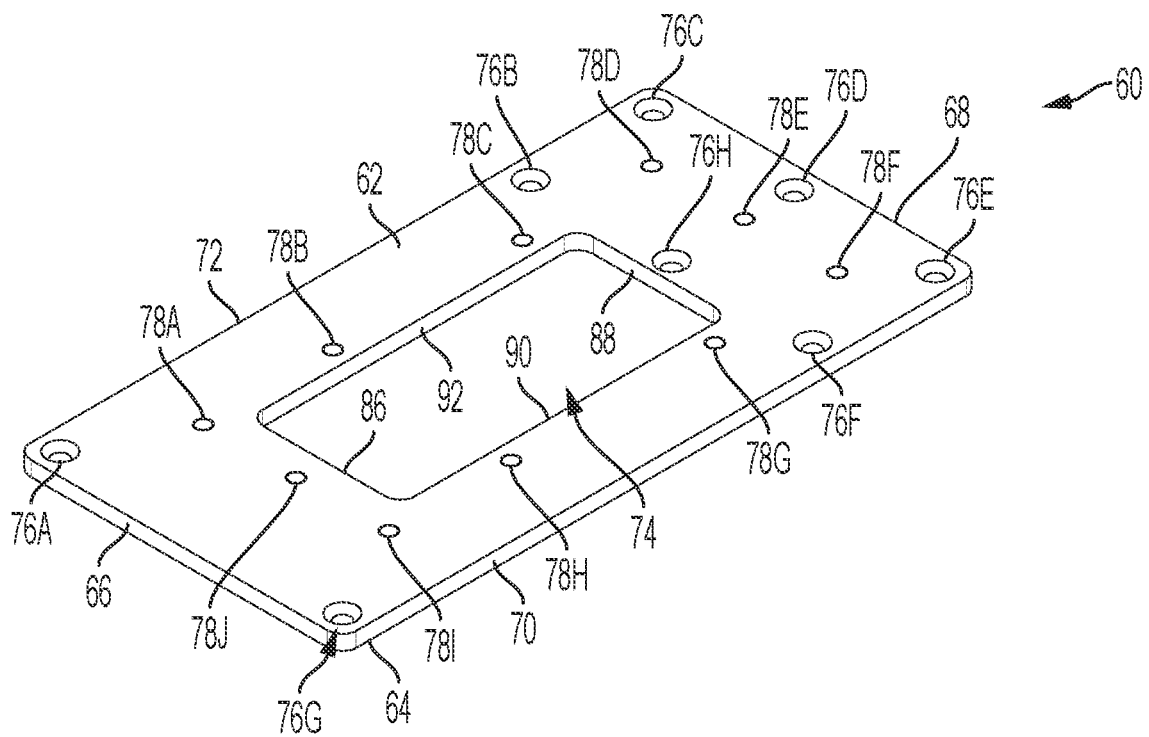
FIG. 8A is a top perspective view of an adapter plate.
Figure 8B:
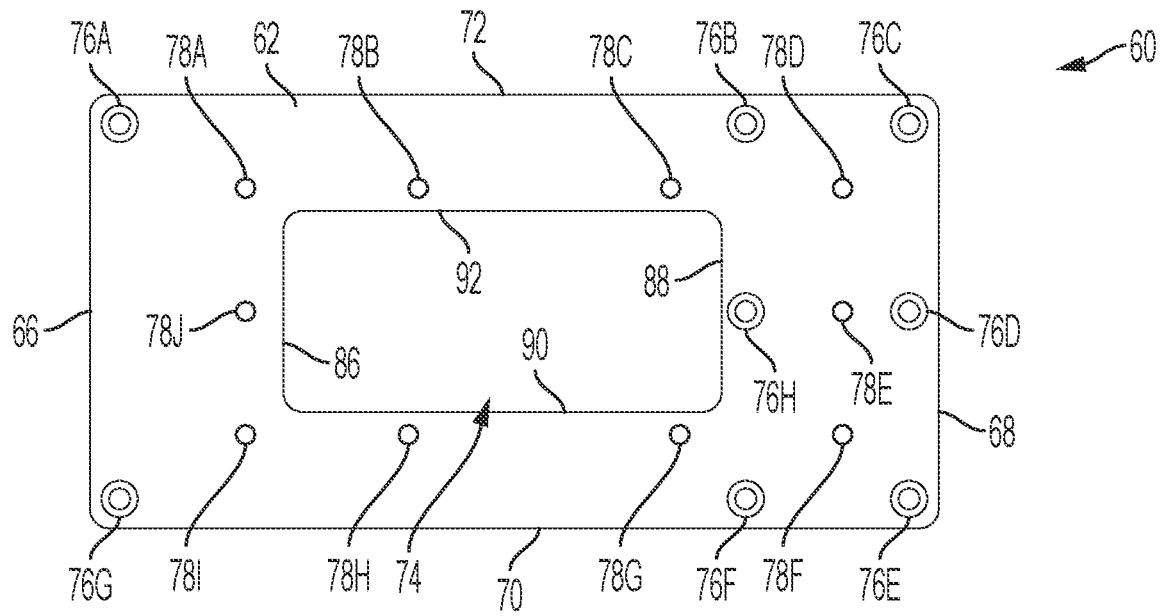
FIG. 8B is a top elevational view of the adapter plate shown in FIG. 8A.

FIG. 8A is a top perspective view of adapter plate 60. FIG. 8B is a top elevational view of adapter plate 60. The following description should be read in view of FIGS. 1-8B.

Adapter plate 60 is generally rectangular and comprises top surface 62, bottom surface 64, front edge 66, rear edge 68, side edge 70, and side edge 80. It should be appreciated, however, that adapter plate 60 may comprise any geometry suitable for safely securing seat 32 to vehicle 10, for example, square, triangular, trapezoidal, circular, ovular, ellipsoidal, etc. Bottom surface 64 is operatively arranged to engage and/or abut against floor 12. Top surface 62 is operatively arranged to engage and/or abut against base 38.

Adapter plate 60 comprises a plurality of holes, for example, holes 76 (also holes 76A-H) and holes 78 (also holes 78A-J). Holes 76/76A-H are through-bores operatively arranged to secure adapter plate 60 to floor 12. Specifically, bolts 80 extend through adapter plate 60 via holes 76A-H, through floor 12, and are secured via washers 82 and nuts 84. In some embodiments, and as shown, each of holes 76A-H comprises a countersink such that the heads of bolts 80 are flush with top surface 62. This is an important aspect of the present disclosure since it allows adapter plate 60 to be installed in vehicle 10 (even without the seat assembly attached thereto) and have little to no interference therein, for example, there is a minimal tripping hazard and materials such as boxes may still be slid along floor 12 without catching on the heads of bolts 80.

Holes 78/78A-J are threaded through-bores operatively arranged to secure base 38 to adapter plate 60. Specifically, and as previously described, bolts 46 extend through one or more washers, for example first through lock washer 48 and then through flat washer 50, through base 38, and threadably engage threaded holes 78A-J. Threaded holes 78A-J allow base 38 and thus seat 32 to be quickly and easily secured to and removed from floor 12, while still maintaining and adhering to the required safety regulations (e.g., FMVSS). Specifically, since holes 78A-J are threaded there is no need to assemble nuts beneath floor 12 on bolts 46, which might require removal of a fuel tank and/or other vehicle components, for example. This allows the end user to install and uninstall the double foldaway seat assembly at will, without significant work.

Adapter plate 60 further comprises aperture 74 arranged between and spaced apart from front edge 66, rear edge 68, side edge 70, and side edge 72. Aperture 74 comprises front edge 86, rear edge 88, side edge 90, and side edge 92. In some embodiments, front edge 86 is arranged parallel to front edge 66, rear edge 88 is arranged parallel to rear edge 68, side edge 90 is arranged parallel to side edge 70, and side edge 92 is arranged parallel to side edge 72.

In some embodiments, through-bores 76B-F and 76H are arranged between and spaced apart from rear edge 68 and rear edge 88. In some embodiments, through-bores 76A-C are arranged between and spaced apart from side edge 72 and side edge 92. In some embodiments, through-bores 76E-G are arranged between and spaced apart from side edge 70 and side edge 90. In some embodiments, through-bores 76A and 76G are arranged between and spaced apart from front edge 66 and side edge 86. In some embodiments, threaded through-holes 78A-D are arranged between and spaced apart from side edge 72 and side edge 92. In some embodiments, threaded through-holes 78F-I are arranged between and spaced apart from side edge 70 and side edge 90. In some embodiments, threaded through-holes 78D-F are arranged between and spaced apart from rear edge 68 and rear edge 88. In some embodiments, threaded through-holes 78A and 78I-J are arranged between and spaced apart from front edge 66 and front edge 68. It should be appreciated that the arrangement of the holes in adapter plate 60 is such that all force testing standards for seating system are complied with, a result that is not seen with current removable double foldaway seat assemblies.

When installed to floor 12, side edge 70 is separated from side wall panel 16 by space S. In some embodiments, space S is greater than or equal to 6.5 inches. In the deployed position, as best shown in FIG. 4, seat 32 overlaps vertical line L extending from side edge 72. In the stored position, as best shown in FIG. 5, seat 32 does not overlap vertical line L.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

10 Vehicle
12 Floor
16 Side wall panel
20 Double foldaway seat assembly
30 Backrest
32 Seat orbench
34 Column
36 Arm or arms
38 Base
40 Lip
42A Truss
42B Truss
44 Holes
46 Bolt
48 Washer
50 Washer
60 Adapter plate
62 Top surface
64 Bottom surface
66 Front edge
68 Rear edge
70 Side edge
72 Side edge
74 Aperture
76 Hole
76A Hole
76B Hole
76C Hole
76D Hole
76E Hole
76F Hole
76G Hole
76H Hole
78 Hole
78A Hole
78B Hole
78C Hole
78D Hole
78E Hole
78F Hole
78G Hole
78H Hole
78I Hole
78J Hole
80 Bolts
82 Washers
84 Nuts
86 Front edge
88 Rear edge
90 Side edge
92 Side edge
CD1 Circumferential direction
CD2 Circumferential direction
CD3 Circumferential direction
CD4 Circumferential direction
D1 Direction
D2 Direction
L Line
S Space

What is claimed is:

1. A seat assembly for a vehicle, comprising:
    an adapter plate operatively arranged to be connected to a floor of the vehicle, comprising:
        a front edge;
        a rear edge;
        a first side edge;
        a second side edge;
        at least one through-hole; and
        an aperture arranged between and spaced apart from the front edge and the rear edge, and the first side edge and the second side edge, wherein the aperture includes:
            an aperture front linear edge;
            an aperture rear linear edge;
            an aperture first side linear edge; and
            an aperture second side linear edge;
    a base operatively arranged to be removably connected to the adapter plate;
    a column fixedly secured to the base; and
    a seat rotatably connected to the column.

2. The seat assembly as recited in claim 1, wherein the at least one through-hole comprises:

six through-holes arranged between and spaced apart from the aperture rear linear edge and the rear edge; and two through-holes arranged between the aperture front linear edge and the front edge.

3. The seat assembly as recited in claim 1, wherein the adapter plate further comprises:

three threaded through-bores arranged between and spaced apart from the aperture front linear edge and the front edge; and three threaded through-holes arranged between and spaced apart from the aperture rear linear edge and the rear edge.

4. The seat assembly as recited in claim 1, wherein the at least one through-hole comprises a countersink.

5. The seat assembly as recited in claim 1, wherein the base is secured to the adapter plate via one or more bolts extending through the base and threadably engaging at least one threaded through-bore in the adapter plate.

6. The seat assembly as recited in claim 1, wherein the adapter plate is connected to the floor via one or more bolts that extend through the at least one through-holes and the floor.

7. The seat assembly as recited in claim 1, further comprising a backrest rotatably connected to the seat.

8. The seat assembly as recited in claim 1, wherein:

in a deployed position, the seat overlaps a line extending vertically from the second edge; and in a stowed position, the seat does not overlap the line.

9. A double foldaway seat assembly for a vehicle, comprising:

an adapter plate operatively arranged to be connected to a floor of the vehicle, comprising:
  a front edge;
  a rear edge;
  a first side edge;
  a second side edge;
  a plurality of through-holes; and
  an aperture arranged between and spaced apart from the front edge and the rear edge, and the first side edge and the second side edge, wherein the aperture comprises:
    an aperture front edge arranged parallel to the front edge;
    an aperture rear edge arranged parallel to the rear edge;
    an aperture first side edge; and
    an aperture second side edge;

a base operatively arranged to be removably connected to the adapter plate;

a column fixedly secured to the base;

a seat rotatably connected to the column; and a backrest rotatably connected to the seat.

10. The double foldaway seat assembly as recited in claim 9, wherein the plurality of through-holes comprises:

six through-holes arranged between and spaced apart from the aperture rear edge and the rear edge; and two through-holes arranged between the aperture front edge and the front edge.

11. The double foldaway seat assembly as recited in claim 9, wherein the adapter plate further comprises:

a plurality of threaded through-bores arranged between and spaced apart from the aperture front edge and the front edge; and a plurality of threaded through-holes arranged between and spaced apart from the aperture rear edge and the rear edge.

12. The double foldaway seat assembly as recited in claim 9, wherein each through-hole of the plurality of through-holes comprises a countersink.

13. The double foldaway seat assembly as recited in claim 9, wherein the base is secured to the adapter plate via a plurality of bolts extending through the base and threadably engaging a plurality of threaded through-bores in the adapter plate.

14. The double foldaway seat assembly as recited in claim 9, wherein the adapter plate is connected to the floor via a plurality of bolts that extend through the plurality of through-holes and the floor.

15. The seat assembly as recited in claim 9, wherein:

in a deployed position, the seat overlaps a line extending vertically from the second side edge; and in a stowed position, the seat does not overlap the line.

16. A seat assembly for a vehicle, comprising:

an adapter plate operatively arranged to be connected to a floor of the vehicle, comprising:
  a top surface;
  a bottom surface;
  a front edge;
  a rear edge;
  a first side edge;
  a second side edge; and
  at least one through-hole;

a base operatively arranged to be removably connected to the adapter plate, the base comprising a lip arranged substantially perpendicular to the top surface;

a column fixedly secured to the base; and a seat rotatably connected to the column.

17. The seat assembly as recited in claim 16, wherein the adapter plate further comprises an aperture arranged between and spaced apart from the front edge and the rear edge, and the first side edge and the second side edge, wherein the aperture comprises at least one linear edge.

18. The seat assembly as recited in claim 16, wherein the adapter plate further comprises an aperture, wherein the aperture comprises at least one linear edge.

19. The seat assembly as recited in claim 18, wherein the at least one linear edge comprises an aperture front linear edge and an aperture rear linear edge.

20. The seat assembly as recited in claim 18, wherein the at least one linear edge is arranged parallel to at least one of the front edge, the rear edge, the first side edge, and the second side edge.

* * * * *